UNITED STATES PATENT OFFICE 2,357,949

PROCESS FOR PREPARING MORDANT DYESTUFFS

Karl Glenz and Franz Neitzel, Basel, Switzerland, assignors to Durand & Huguenin A. G., Basel, Switzerland No Drawing. Application February 26, 1942, Serial No. 432,514. In Germany March 1, 1941

14 Claims. (Cl. 260—244)

It has been found that by the action of a compound of the general formula:

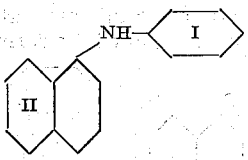

wherein the benzene nucleus I bears an OH— and a COOH— group in an ortho-position to each other, and the nucleus II of the naphthalene molecule contains advantageously solubilizing groups, preferably sulpho-groups, with the nitroso compound of β-resorcylic acid in a suitable dissolving and/or diluting agent, in the presence of acid, useful new mordant dyestuffs can be obtained, which may be regarded as oxazin dyestuffs. These dyestuffs are most useful for chrome printing on cotton, on artificial fibres of regenerated cellulose and other fibres and show beside their good fastness properties, the advantage of being resistant against reducing agents to such an extent, that they can be used in reducing discharge coloured printing, so that they represent a valuable enrichment of this field.

The starting material represented by the above mentioned formula can be obtained according to the process of U. S. A. Patent 2,048,283. A compound obtained directly according to said process containing more than one molecule of amino salicylic acid, as well as the product obtained from this compound by splitting off the loosely bound aminosalicylic acid, can be used.

For the purpose, the nitroso-β-resorcylic acid may be produced as for instance from β-resorcylic acid, sodium nitrite and copper sulphate. (See Chem. Centralblatt 1928 II, page 759, W. Gulinow.) A metal compound of the said nitroso compound, for instance the copper compound, can be used directly for the dyestuff preparation. It is remarkable, that the above cited condensation with the nitroso compound into the dyestuff can in many instances already be carried out at ordinary temperature. In other instances, it is advisable to work at a higher temperature.

The process is illustrated, but not limited, by the following examples:

Example 1

36 parts (the parts being by weight) of the condensation product of 1-naphthylamine-6-sulphonic acid and p-aminosalicylic acid of the formula

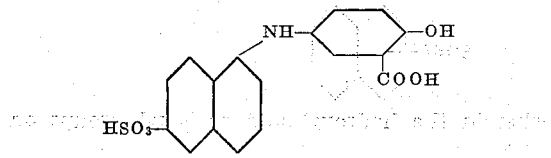

i. e. 4′-oxy-3′-carboxy-1-phenyl-naphthylamine-6-sulphonic acid, obtained according to the process of U. S. Patent 2,048,283, 250 parts of methyl-alcohol, 40 parts of the copper compound of nitroso-β-resorcylic acid are stirred at ordinary temperature. 55 parts of hydrochloric acid of 30% are added. The mass becomes rapidly red brown, and the dyestuff precipitates slowly in the form of the free dyestuff acid. On the following day the dyestuff acid is separated by filtration and then in order to remove the copper, washed with hydrochloric acid of 10% and filtered again. The dyestuff is brought into solution with the necessary quantities of sodium carbonate and water, and finally salted out.

The dyestuff thus obtained is a black powder, which, when dissolved in water, gives a red brown shade. This shade turns to blue violet when caustic soda is added. If an acid is added to the solution the free dyestuff acid is precipitated in the form of dark violet flocks. The shade of the solution in concentrated sulphuric acid is blue. If the solution is diluted with water, the shade turns first to carmine red; on further dilution the dyestuff acid precipitates.

In chrome printing on cotton, or viscose, a black of good fastness is obtained, being resistant against hydrosulphite discharge.

As the dyestuff is not affected by oxidizing agents, it may also be fixed with chromate.

Example 2

36 parts (the parts being by weight) of the condensation product of 1-naphthylamine-6-sulphonic acid and o-aminosalicylic acid of the formula:

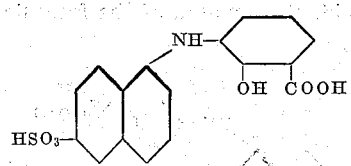

i. e.: 2′-oxy-3′-carboxy-1-phenyl-naphthylamine-6-sulphonic acid, obtained according to the process of U. S. A. Patent 2,048,283, 250 parts of methyl-alcohol, 40 parts of the copper compound of nitroso-β-resorcylic acid are stirred thoroughly at ordinary temperature. 55 parts of hydrochloric acid of 30% are added. The mass becomes rapidly brown, and the dyestuff thus formed precipitates gradually. When the reaction is over, the product is filtered, the copper is removed as well as possible by washing, as indicated in Example 1, with diluted hydrochloric acid. The dyestuff is transformed into the alkali salt. This new dyestuff behaves in the same manner as the one prepared according to Example 1.

The solution in concentrated sulphuric acid is blue-violet (against blue in Example 1). The red-brown watery solution of the product turns to red-violet when caustic soda is added (against blue-violet for the dyestuff made according to Example 1). In chrome printing on cotton as well as on viscose, fast, black, also discharge resisting shades are obtained.

*Example 3*

In a similar way, a dyestuff is obtained with 36 parts of the condensation product of 1-naphthylamine-7-sulphonic acid and p-aminosalicylic acid, i. e. 4'-oxy-3'-carboxyl-1-phenyl-naphthylamine-7-sulphonic acid, 250 parts of methyl-alcohol and 40 parts of the copper compound of nitroso β-resorcylic acid.

The new dyestuff is a black powder, which, when dissolved in water, becomes brown and turns to violet when caustic soda is added. When adding acid to this solution, the dyestuff precipitates as free acid in dark brown flocks. When dissolved in concentrated sulphuric acid, the product becomes blue; if water is added, the solution turns to red, and the dyestuff precipitates.

When printing on cotton with chromium mordants, black shades are obtained, which are resistant against hydrosulphite discharge.

In a corresponding way, similar dyestuffs can be obtained from nitroso-β-resorcylic acid on the one hand, and the condensation products of p-aminosalicylic acid with 1-naphthylamine-5-sulphonic acid, 1-naphthylamine-8-sulphonic acid and with the technical mixture of 1-naphthylamine-6-sulphonic acid and -7-sulphonic acid on the other hand.

In some instances, it is preferable to carry out the condensation at a slightly raised temperature.

In the above stated process, one can use as dissolving and/or diluting agents, in place of methyl-alcohol, ethyl-alcohol, glacial acetic acid, amongst others, and in place of hydrochloric acid, diluted sulphuric acid.

A similar dyestuff can be obtained from the condensation product of 1-naphthylamine and p-aminosalicylic acid by the action of nitroso-β-resorcylic acid, and subsequent sulphonation of the dyestuff thus formed.

What we claim is:

1. The new mordant dyestuffs obtained by bringing to reaction in a diluent and in the presence of acid, a compound of the formula

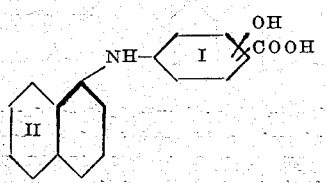

wherein the hydroxy and carboxyl groups on nucleus I are in ortho position to each other, with a member of the group consisting of nitroso-β-resorcylic acid and metal compounds thereof, and by sulfonating the nucleus II of the naphthalene molecule, the sulfonation being carried out at any stage of the process, said products constituting valuable dyestuffs for discharge printing, yielding valuable black shades when printed with chromium mordant on cotton or on artificial silk from regenerated cellulose.

2. The new mordant dyestuffs obtained by bringing to reaction in a diluent and in the presence of acid, a compound of the formula

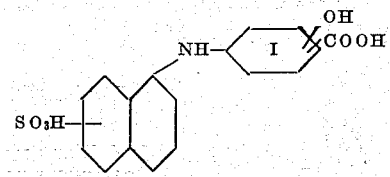

wherein the hydroxyl and carboxyl groups on nucleus I are in ortho position to each other, with nitroso-β-resorcylic acid, said products constituting valuable dyestuffs for discharge printing, yielding valuable black shades when printed with chromium mordant on cotton or on artificial silk from regenerated cellulose.

3. The new mordant dyestuff obtained by bringing to reaction in a diluent and in the presence of acid, a compound of the formula

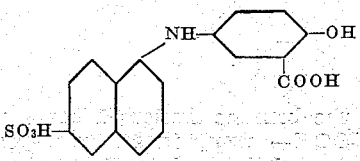

with nitroso-β-resorcylic acid, said product constituting a valuable dyestuff for discharge printing, yielding valuable black shades when printed with chromium mordant on cotton or on artificial silk from regenerated cellulose.

4. The new mordant dyestuff obtained by bringing to reaction in a diluent and in the presence of acid, a compound of the formula

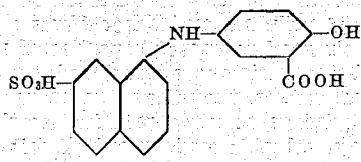

with nitroso-β-resorcylic acid, said product constituting a valuable dyestuff for discharge printing, yielding valuable black shades when printed with chromium mordant on cotton or on artificial silk from regenerated cellulose.

5. The new mordant dyestuffs obtained by bringing to reaction in a diluent and in the presence of acid, a compound of the formula

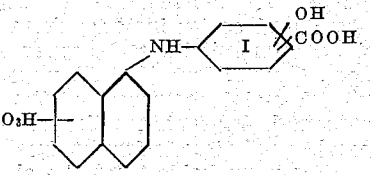

wherein the hydroxyl and carboxyl groups on nucleus I are in ortho position to each other, with a metal compound of nitroso-β-resorcylic acid, said products constituting valuable dyestuffs for discharge printing, yielding valuable black shades when printed with chromium mordant on cotton or on artificial silk from regenerated cellulose.

6. The new mordant dyestuffs obtained by bringing to reaction in a diluent and in the presence of acid, a compound of the formula

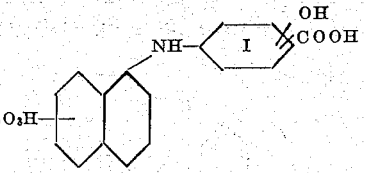

wherein the hydroxyl and carboxyl groups on nucleus I are in ortho position to each other with the copper compound of nitroso-β-resorcylic acid, said products constituting valuable dyestuffs for discharge printing, yielding valuable black shades when printed with chromium mordant on cotton or on artificial silk from regenerated cellulose.

7. The new mordant dyestuff obtained by bringing to reaction in methyl alcohol and in the presence of hydrochloric acid, a compound of the formula

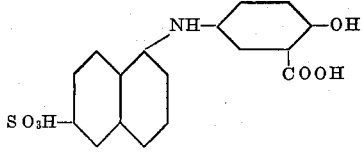

with the copper compound of nitroso-β-resorcylic acid, said product constituting a valuable dyestuff for discharge printing, yielding valuable black shades when printed with chromium mordant on cotton or on artificial silk from regenerated cellulose.

8. A method for the production of new mordant dyestuffs for discharge printing, yielding valuable black shades when printed with chromium mordant on cotton or on artificial silk from regenerated cellulose, which comprises bringing to reaction in a diluent and in the presence of acid, a compound of the formula

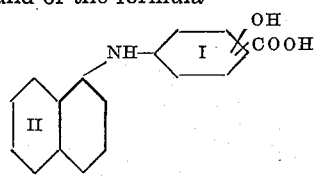

wherein the hydroxy and carboxyl groups on nucleus I are in ortho position to each other, with a member of the group consisting of nitroso-β-resorcylic acid and metal compounds thereof, and sulfonating the nucleus II of the naphthalene molecule, the sulfonation being carried out at any stage of the process.

9. A method for the production of new mordant dyestuffs for discharge printing yielding valuable black shades when printed with chromium mordant on cotton or on artificial silk from regenerated cellulose, which comprises bringing to reaction in a diluent and in the presence of acid, a compound of the formula

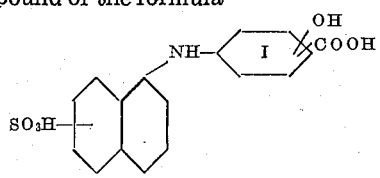

wherein the hydroxyl and carboxyl groups on nucleus I are in ortho position to each other with nitroso-β-resorcyclic acid.

10. A method for the production of a new mordant dyestuff for discharge printing, yielding valuable black shades when printed with chromium mordant on cotton or on artificial silk from regenerated cellulose, which comprises bringing to reaction in a diluent and in the presence of acid, a compound of the formula

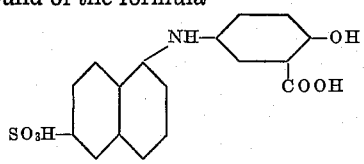

with nitroso-β-resorcylic acid.

11. A method for the production of a new mordant dyestuff for discharge printing, yielding valuable black shades when printed with chromium mordant on cotton or on artificial silk from regenerated cellulose, which comprises bringing to reaction in a diluent and in the presence of acid, a compound of the formula

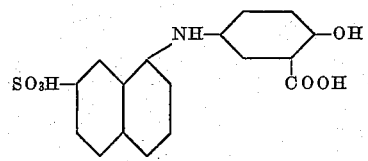

with nitroso-β-resorcylic acid.

12. A method for the production of new mordant dyestuffs for discharge printing, yielding valuable black shades when printed with chromium mordant on cotton or on artificial silk from regenerated cellulose, which comprises bringing to reaction in a diluent and in the presence of acid, a compound of the formula

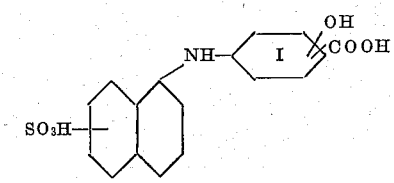

wherein the hydroxyl and carboxyl groups on nucleus I are in the ortho position to each other, with a metal compound of nitroso-β-resorcylic acid.

13. A method for the production of new mordant dyestuffs for discharge printing, yielding valuable black shades when printed with chromium mordant on cotton or on artificial silk from regenerated cellulose, which comprises bringing to reaction in a diluent and in the presence of acid, a compound of the formula

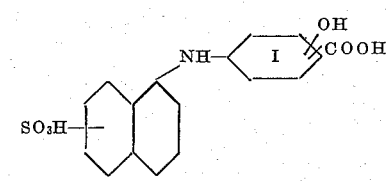

wherein the hydroxyl and carboxyl groups on nucleus I are in the ortho position to each other, with the copper compound of nitroso-β-resorcylic acid.

14. A method for the production of a new mordant dyestuff for discharge printing, yielding valuable black shades when printed with chromium mordant on cotton or on artificial silk from regenerated cellulose, which comprises bringing to reaction in methyl alcohol and in the presence of hydrochloric acid, a compound of the formula

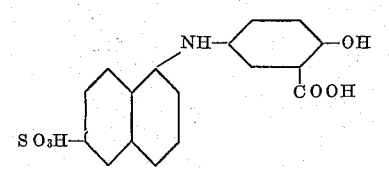

with the copper compound of nitroso-β-resorcylic acid.

KARL GLENZ.
FRANZ NEITZEL.